Figure 1:
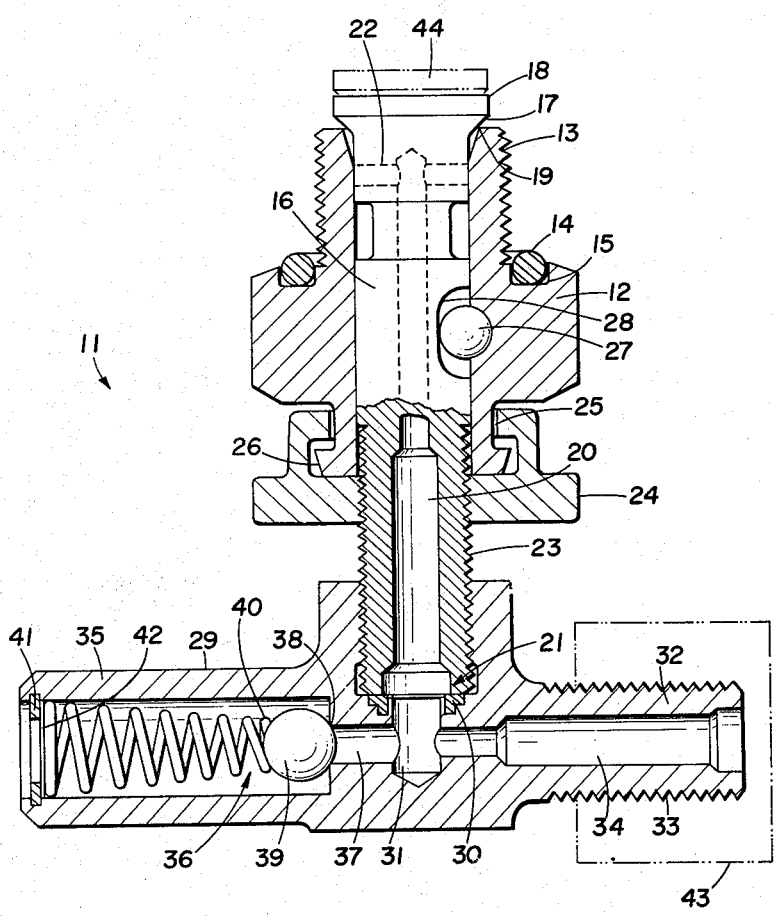

Inventor
BRYAN CYRIL ALFORD
by: Cavanagh & Norman.

United States Patent Office 3,183,931
Patented May 18, 1965

3,183,931
CHARGING VALVE FOR OLEO PNEUMATIC
AIRCRAFT LANDING STRUTS
Bryan Cyril Alford, Downsview, Ontario, Canada, assignor to The De Havilland Aircraft of Canada, Limited, Downsview, Ontario, Canada
Filed Feb. 25, 1963, Ser. No. 260,595
Claims priority, application Canada, Feb. 9, 1963, 868,449
4 Claims. (Cl. 137—612.1)

This invention relates to improvements in charging valves such as may be used in pressurizing tires, aircraft shock absorbers struts and the like.

In the provision of the necessary ground services required to maintain aircraft, one problem long associated therewith is the necessity of providing different charging pressures for the various functions of the aircraft such as for instance, tire inflation, recharging of air bottles, and the recharging of the oleo strut on the undercarriage.

It will be evident that since the pressures involved with the various devices on the aircraft vary considerably then some care must be exercised in selecting a suitable charging unit. It will also be evident that in certain instances unsuitable charging equipment may be employed to recharge a particular device and in the case of the charging pressure being in excess of that required then serious damage can result to the unit being charged.

This problem is not peculiar only to aircraft, indeed in almost every instance where vessels and the like are charged with pressure the possibility of overcharging is always present. Such possibilities of overcharging may also occur, for instance, in inflatible rafts, storage tanks, and the like.

One approach to this problem that has often been tried is the provision of a pressure relief valve installed on to the pressure vessel proper whereby any tendency to over pressure may be vented through this valve. It will be appreciated that a pressure relief valve set for a particular pressure is sensitive in this particular region of pressure, and where the normal pressure is close to the maximum allowable such prior types of valves often leak. In the case where a comparatively high leak rate would not be acceptable other means of protection against overcharging must be found.

Again it is often the case that a chamber may have a certain charging pressure, which for design conditions should not be exceeded, and that afterwards in service, higher pressures are encountered. The use of a conventional pressure relief valve in the chamber set at the charging pressure would not be acceptable in this case.

As an example of this last case the De Havilland Caribou aircraft manufactured by the De Havilland Aircraft of Canada, Limited, Downsview, Ontario, has two air charging points on each oleo pneumatic shock absorber. One chamber in each strut is charged with air at 1030 p.s.i.g. while a second chamber is charged at 150 p.s.i.g. Quite frequently, the wrong chamber is subjected to the high pressure charge, despite a warning label placed adjacent to the charging points. It is not desirable to make the two charging points dissimilar in thread size or style since they must both be of a standard type compatible with ground installations around the world.

Accordingly, it is an object of the present invention to provide a charging valve having pressure release means therein, whereby overcharging of a vessel or the like is prevented.

It is a further object of this invention to provide the aforementioned safety release which may be adaptable for use with conventional charging valve.

The present invention seeks to achieve these and other objects and features of this invention such as will be apparent from the following detailed description and accompanying drawings by the provision of a charging valve including means for connecting said valve to a pressure supply and a safety release valve positioned at the point of maximum pressure.

In the drawings:

FIGURE 1 is a vertical mid-section to a presently preferred embodiment of an improved charging valve according to the present invention.

Having reference to FIGURE 1, a charging valve indicated generally as 11 comprises a stop valve body 12 having a central bore therethrough and having one end provided with thread 13 for attachment of body 12 to a unit to be charged. Sealing means between a unit to be charged and body 12 is provided by means of a gasket 14 which in this preferred embodiment is recessed within groove 15.

A spool 16 is mounted for reciprocal movement within the bore of body 12 and may move from a closed to an open position. A sealing face 17 is provided on the enlarged end 18 of spool 16 and in the closed position is adapted to sealably encounter rim 19 formed at one end of body 12 by the central bore therethrough.

A central passage 20 within spool 16 is formed from one end 21 of spool 16 through most of the length thereof and is in communication with the outer diameter of spool 16 by means of cross bore 22, the outlet of cross bore 22 being adjacent to sealing space 17. End 21 of spool 16 is provided with threads 23 which are in engagement with a captive nut 24. An inwardly depending flange 25 on nut 24 is in engagement with an outwardly depending flange 26 on body 12 whereby nut 24 is rotatably secured to body 12.

The reciprocable movement of spool 16 within body 12 is caused by rotation of captive nut 24 and the threading of the spool 16 by means of thread 23. The travel of spool 16 is limited by means of stop 27 seated in body 12 and projecting into a slot 28 within spool 16, the stop 27 also preventing rotation of spool 16 when threading nut 24.

A pressure release valve housing 29 is threadably secured to end 21 of spool 16, a seal therebetween being provided by means of seal 30 pressurably bearing against end 21.

Housing 29 is in the form of a T, the leg of the T being in communication with spool 16 through a centre passage 31. One arm 32 of the T shaped housing 29 is provided with threads 33 for attachment of the valve 11 to a pressure hose or other. A central passage 34 in arm 32 provides communication through said arm into the centre passage 31. As will be seen from the drawings, these passages are at approximately right angles to each other.

The other arm 35 of the T shaped housing 29 is provided with an internal chamber 36. A reduced bore 37 which is at right angles to centre chamber 31 and substantially in line with bore 34 is formed in arm 35 and provides a valve seat 38 and one end of chamber 36. A spherical valve member 39 of a diameter greater than the bore 37 is adapted to seal on valve seat 38 in the at rest position. Member 39 is maintained in the sealed at rest positioned by a spring 40 pressurably biased against valve member 39 and held at a predetermined pressure setting by means of a retaining clip 41 located at the exterior end of chamber 36 in arm 35. It is preferable in this present embodiment to provide a screen 42 over the open end of chamber 36 to prevent the entry of dirt and foreign matter which may tend to clog or cause to leak valve member 39. To this end it is preferable also to provide a dust cap 43 which may cover arm 32 when the valve is not being used to charge.

In utilizing this invention body 12 may be secured to the device to be charged such as for instance a pressure chamber on an aircraft oleo leg, by means of securing thread 13 to the fitting provided on the oleo leg. It will be seen that it is necessary to secure body 12 up tight against this fitting in order that gasket 14 is sealed. Dust cap 43 may be removed and the charging hose secured to arm 32 by means of thread 33 provided and the charging pressure may be turned on.

Rotation of the captive nut 24 will cause a movement of spool 16 the enlarged end 18 taking the position indicated as 44 in phantom. This will unseat face 17 from rim 19 and provide communication from bore 34 in arm 32 through bore 20 in spool 16 and out through crossbore 22 and into the device to be charged. The limit stop 27 will of course prevent over-rotation of the spool 16 and the amount of opening provided by slot 28 being sufficient to allow good flow of charging pressure through the device.

It will also be seen that during flow of fluid through the device that a sudden change of direction is provided when the fluid passes from bore 34 into central bore 20 and for this reason a pressure drop would occur at this change of direction.

Upon an over pressure being applied to the device, the excess pressure in bore 37 will overcome the biassing of spring 40 and force the valve elements 39 away from valve seat 38 and the excess pressure may bleed off through screen 42. It will be understood that the pressure at which bleed off would occur may be varied by varying the diameter of bore 37 and the biassing as applied by spring 40.

It will be further understood that since bore 37 is substantially in line with bore 34 then the maximum pressure developed will occur in bore 37 due not only to the in lined condition, that is to say, minimum pressure drop, but also will be partly due to the ram effect of the air flowing through bore 34.

Upon completion of the charging to the desired pressure captive nut 24 may be manipulated in an opposite direction whereby spool 16 will be drawn back into valve body 12 and face 17 will then seat against sealing rim 19 after which the charging hose may be disconnected from arm 32 and dust cover 43 may be replaced. It will be seen that in this condition the pressure within the chamber is not acting directly upon the pressure release valve that is to say, the valve element 39 and for this reason the seal at this position need not be a particularly permanent type of seal but that leakage may occur during the charging without any ill effect. This above feature is quite advantageous since it is well known that many difficulties due to slow leakage can occur with a pressure release valve under constant pressure.

Further to this, applicant provides for the automatic connection of the safety release valve to the charging system during the charging and in addition provides for the automatic isolation of the release valve from the unit to be charged during the charged at rest position.

It is to be further understood that although a certain embodiment of this invention has been herein described and illustrated the invention also contemplates such modifications and changes as may fall within the scope of the appended claims.

What I claim is:

1. A charging valve incorporating a spring loaded pressure relief valve for use with aircraft oleo pneumatic landing struts and the like and comprising: a charging valve body portion; outlet connection means for attachment of said body portion to said struts; a passageway defined by said body portion; valve means in said body portion operable to occlude said passageway; a charging valve inlet connecting member of T-shaped construction; air pressure supply connecting means on one arm of said T; a passageway defined by the leg of said T in communication with said passageway in said body portion; passageways defined by the arms of said T axially aligned with one another, one of said passageways providing a housing for said pressure relief valve and the other said passageway communicating with said air pressure supply connecting means, said valve means including a core member slidably located in said passageway of said body portion and extending axially from both ends thereof, and a valve head on one end of said core member oriented to occlude said passageway.

2. A charging valve incorporating a spring loaded pressure relief valve for use with aircraft oleo pneumatic landing struts and the like and comprising: a charging valve body portion; outlet connection means for attachment of said body portion to said struts; a passageway defined by said body portion; valve means in said body portion operable to occlude said passageway; a charging valve inlet connecting member of T-shaped construction; air pressure supply connecting means on one arm of said T; a passageway defined by the leg of said T in communication with said passageway in said body portion; passageways defined by the arms of said T axially aligned with one another, one of said passageways providing a housing for said pressure relief valve and the other said passageway communicating with said air pressure supply connecting means, said valve means including a core member slidably located in said passageway of said body portion and extending axially from both ends thereof, and a valve head on one end of said core member oriented to occlude said passageway; a drilling extending through said core member along the axis thereof, and, communicating with said passageway in said body portion at one end thereof, the other end of said core member being attached to said leg of said charging valve inlet connecting member with said drilling in communication with said passageway therein.

3. A charging valve incorporating a spring loaded pressure relief valve for use with aircraft oleo pneumatic landing struts and the like and comprising: a charging valve body portion; outlet connection means for attachment of said body portion to said struts; a passageway defined by said body portion; valve means in said body portion operable to occlude said passageway; a charging valve inlet connecting member of T-shaped construction; air pressure supply connecting means on one arm of said T; a passageway defined by the leg of said T in communication with said passageway in said body portion; passageways defined by the arms of said T axially aligned with one another, one of said passageways providing a housing for said pressure relief valve and the other said passageway communicating with said air pressure supply connecting means, said valve means including a core member slidably located in said passageway of said body portion and a valve head on one end of said core member oriented to occlude said passageway; and, manually operable means for sliding said core member within said body portion.

4. A charging valve incorporating a sping loaded pressure relief valve for use with aircraft oleo pneumatic landing struts and the like and comprising: a charging valve body portion; outlet connection means for attachment of said body portion to said struts; a passageway defined by said body portion; valve means in said body portion operable to occlude said passageway; a charging valve inlet connecting member of T-shaped construction; air pressure supply connecting means on one arm of said T; a passageway defined by the leg of said T in communication with said passageway in said body portion; passageways defined by the arms of said T axially aligned with one another, one of said passageways providing a housing for said pressure relief valve and the other said passageway communicating with said air pressure supply connecting means, said valve means including a core member slidably located in said passageway of said body portion and a valve head on one end of said core member oriented to occlude said passageway; manually operable means for sliding said core member within said body portion; and, stop means limiting sliding movement of said core member.

References Cited by the Examiner

UNITED STATES PATENTS

| | | | |
|---|---|---|---|
| 314,719 | 3/85 | Reese | 137—612.1 |
| 1,039,804 | 10/12 | Richart | 137—224 |
| 1,160,050 | 11/15 | Dalton | 137—224 XR |
| 1,443,675 | 1/23 | Bowler | 137—540 |
| 1,459,939 | 6/23 | Urtubees | 137—539 |
| 2,272,243 | 2/42 | Jacobsson | 137—550 XR |
| 2,591,514 | 4/52 | Courtot | 251—353 XR |
| 2,600,976 | 6/56 | Dalrymple | 251—347 |
| 2,761,468 | 9/56 | Thatcher | 137—539 |

M. CARY NELSON, *Primary Examiner.*